United States Patent [19]

Weder

[11] Patent Number: 5,531,058
[45] Date of Patent: *Jul. 2, 1996

[54] MEANS FOR SECURING A DECORATIVE COVER ABOUT A FLOWER POT

[75] Inventor: Donald E. Weder, Highland, Ill.

[73] Assignee: Southpac Trust International, Inc. as trustee of The Family Trust U/T/A, Oklahoma City, Okla.

[ * ] Notice: The term of this patent shall not extend beyond the expiration date of Pat. No. 5,105,599.

[21] Appl. No.: 395,030

[22] Filed: Feb. 27, 1995

Related U.S. Application Data

[63] Continuation of Ser. No. 124,843, Sep. 21, 1993, Pat. No. 5,417,033, which is a continuation of Ser. No. 819,311, Jan. 9, 1992, abandoned, which is a continuation of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned.

[51] Int. Cl.6 .................... B65B 11/58; B65B 27/00
[52] U.S. Cl. .................... 53/399; 53/397; 53/449; 53/464
[58] Field of Search .................... 53/138.1, 397, 53/399, 449, 464, 176, 221, 390, 580, 582, 583, 585, 592; 47/72; 100/2, 9, 212; 215/12.1; 229/45

[56] References Cited

U.S. PATENT DOCUMENTS

| Re. 27,744 | 8/1973 | Billett et al. . |
|---|---|---|
| Re. 31,354 | 8/1983 | Cheung . |
| D. 295,525 | 5/1988 | Sakaki et al. . |
| 1,964,887 | 7/1934 | Lovett, Jr. . |
| 1,994,962 | 3/1935 | Rushfeldt . |
| 2,133,278 | 10/1938 | Brogden . |
| 2,236,936 | 4/1941 | Camp . |
| 2,274,526 | 2/1942 | Bunn . |
| 2,367,168 | 1/1945 | Cheesman . |
| 2,514,038 | 7/1950 | Doolittle . |
| 2,774,187 | 12/1956 | Smithers . |
| 2,882,660 | 4/1959 | Denton . |
| 3,015,916 | 1/1962 | Denton . |
| 3,078,631 | 2/1963 | Seserman . |
| 3,104,937 | 9/1963 | Wyckoff et al. . |
| 3,125,907 | 3/1964 | Derrickson . |
| 3,126,686 | 3/1964 | Kobylanski et al. . |
| 3,129,728 | 4/1964 | Sharko . |
| 3,135,192 | 6/1964 | Derrickson . |
| 3,152,539 | 10/1964 | Sorensen . |
| 3,163,899 | 1/1965 | Karass . |
| 3,164,372 | 1/1965 | Derrickson . |
| 3,186,333 | 6/1965 | Hoffman et al. . |
| 3,189,060 | 6/1965 | Attas . |

(List continued on next page.)

FOREIGN PATENT DOCUMENTS

| 1084888 | 10/1953 | France . |
|---|---|---|
| 15550 | of 1899 | United Kingdom . |

OTHER PUBLICATIONS

*Bandmaster 102 Model AF*, Rubber Band Technology, Ltd., Sep., 1988.
*BandMaster 102 Model ET*, Rubber Band Technology, Ltd. Oct., 1988.
*Sivaron S–661 & 661Y*, Strapack Inc, Tokyo, Japan, 1984.
*StraPack Semiautomatic Strapping Machine S–660*, Strapack, 1988.

(List continued on next page.)

*Primary Examiner*—Linda Johnson
*Attorney, Agent, or Firm*—Dunlap & Codding

[57] ABSTRACT

A method and apparatus for securing a sheet of material about a flower pot for providing a decorative cover to the flower pot, using a band applicator with an object opening. The sheet of material is held in place on the flower pot and the flower pot with the sheet of material held there about is inserted into the object opening of the band applicator. The band applicator applies a band about the sheet of material and the flower pot whereby the sheet of material is secured to the flower pot via the band.

17 Claims, 2 Drawing Sheets

U.S. PATENT DOCUMENTS

| | | |
|---|---|---|
| 3,192,584 | 7/1965 | Pape . |
| 3,204,312 | 9/1965 | Derrickson et al. . |
| 3,224,363 | 12/1965 | Talbot . |
| 3,251,295 | 5/1966 | Dickens . |
| 3,258,221 | 6/1966 | Derrickson et al. . |
| 3,263,599 | 8/1966 | Dickens . |
| 3,264,022 | 8/1966 | Talbot . |
| 3,279,354 | 10/1966 | Dickens . |
| 3,288,055 | 11/1966 | Vellrath . |
| 3,316,675 | 5/1967 | Cartwright, Jr. . |
| 3,316,687 | 5/1967 | Bartlett, Jr. . |
| 3,318,230 | 5/1967 | Hilton . |
| 3,324,317 | 6/1967 | Armstrong et al. . |
| 3,368,323 | 2/1968 | Wood . |
| 3,393,633 | 7/1968 | Hoffman et al. . |
| 3,545,723 | 12/1970 | Raley . |
| 3,554,846 | 1/1971 | Billett . |
| 3,612,480 | 10/1971 | Guy . |
| 3,612,481 | 10/1971 | Guy . |
| 3,636,861 | 1/1972 | Weller . |
| 3,639,530 | 2/1972 | Ryan . |
| 3,662,790 | 5/1972 | Styner . |
| 3,691,939 | 9/1972 | Goodley . |
| 3,709,758 | 1/1973 | Gilmore . |
| 3,750,239 | 8/1973 | Styner . |
| 3,759,169 | 9/1973 | Goodley . |
| 3,783,079 | 1/1974 | Wehr . |
| 3,799,835 | 3/1974 | Gilmore . |
| 3,826,443 | 7/1974 | Goodley . |
| 3,841,213 | 10/1974 | Goodley . |
| 3,847,071 | 11/1974 | Goodley . |
| 3,851,683 | 12/1974 | Glaus et al. . |
| 3,873,387 | 3/1975 | Schoening . |
| 3,896,525 | 7/1975 | Stewart, Jr. et al. . |
| 3,924,354 | 12/1975 | Gregoire . |
| 3,949,662 | 4/1976 | Woomer . |
| 3,963,191 | 6/1976 | Goodley . |
| 3,974,762 | 8/1976 | Kita et al. . |
| 3,984,278 | 10/1976 | Styner et al. . |
| 3,995,409 | 12/1976 | Discavage et al. . |
| 4,005,647 | 2/1977 | Goodley et al. . |
| 4,020,756 | 5/1977 | Weiss . |
| 4,020,879 | 5/1977 | Billett et al. . |
| 4,054,160 | 10/1977 | Knudsen . |
| 4,062,918 | 12/1977 | Nakanose . |
| 4,086,117 | 4/1978 | Pearsall . |
| 4,090,008 | 5/1978 | Haley . |
| 4,093,146 | 6/1978 | Haley . |
| 4,096,019 | 6/1978 | Lehmann . |
| 4,101,625 | 7/1978 | Haley . |
| 4,137,788 | 2/1979 | Fischer . |
| 4,143,594 | 3/1979 | Falq . |
| 4,152,475 | 5/1979 | Haley . |
| 4,189,868 | 2/1980 | Tymchuck et al. . |
| 4,216,620 | 8/1980 | Weder . |
| 4,220,493 | 9/1980 | Wehr et al. . |
| 4,223,704 | 9/1980 | Glaus . |
| 4,227,949 | 10/1980 | Wehr . |
| 4,252,158 | 2/1981 | McDade . |
| 4,253,227 | 3/1981 | Bullington . |
| 4,254,703 | 3/1981 | Fulton et al. . |
| 4,297,811 | 11/1981 | Weder . |
| 4,300,312 | 11/1981 | Weder . |
| 4,300,976 | 11/1981 | Wehr . |
| 4,328,742 | 5/1982 | Discavage . |
| 4,362,096 | 12/1982 | Hanscom . |
| 4,383,881 | 5/1983 | Sakaki . |
| 4,401,020 | 8/1983 | Brux . |
| 4,444,097 | 4/1984 | Wehr et al. . |
| 4,450,032 | 5/1984 | Wehr . |
| 4,454,808 | 6/1984 | Wehr et al. . |
| 4,483,516 | 11/1984 | Wehr . |
| 4,533,046 | 8/1985 | Kuhnert et al. . |
| 4,536,248 | 8/1985 | Bullington et al. . |
| 4,554,779 | 11/1985 | Fischer . |
| 4,570,415 | 2/1986 | Centeno . |
| 4,635,542 | 1/1987 | Sebelist et al. . |
| 4,711,071 | 12/1987 | Kagi . |
| 4,718,219 | 1/1988 | Schmitz . |
| 4,725,009 | 2/1988 | Fahrbach . |
| 4,733,521 | 3/1988 | Weder et al. . |
| 4,768,276 | 9/1988 | Harlow . |
| 4,773,182 | 9/1988 | Weder et al. . |
| 4,835,834 | 1/1989 | Weder . |
| 4,901,423 | 2/1990 | Weder . |
| 5,077,937 | 1/1992 | Weder et al. . |
| 5,111,638 | 5/1992 | Weder . |
| 5,120,382 | 6/1992 | Weder . |
| 5,129,182 | 7/1992 | Weder . |
| 5,181,364 | 1/1993 | Weder . |
| 5,184,390 | 2/1993 | Weder . |
| 5,231,794 | 8/1993 | Weder et al. . |

OTHER PUBLICATIONS

*Uni–Pac Portable Strapping Kit*, Universal Strapping Corp. No Date.

*Cyklop EM*–15, Cyklop Strapping Corp., Downingtown, PA, 2 pgs. 1987.

*How To Strap Without Getting In A Bind* Strapex Corp, 2pgs no date.

*ASM Series*, Cyklop Strapping Corp., Downingtown, PA 2 pgs., 1988.

*StraPack Semiauto. Strapping Mach. S*–662, Strapack Corp, Tokyo 2 pg.

*Strapack Semiauto. Polypropylene Strapping Mach., Sivaron SS*–40 Strapack Corp, Tokyo, Japan; 2 pgs, no date.

*Strapack Semiauto. Strapping Machines Sivaron S*–661, S661L Strapack Corp, Tokyo, Japan; 2 pgs, no date.

*Universal Strapping SemiAuto. Plastic Strap. Mach.*, Universal Strapping Corp.

*Universal Strapping Extruders of Plastic Strapping*, 8 pgs. Universal Strapping Corp, Brooklyn, NY, No Date.

*Heavy Duty Tyer*, Malow Corp., Mount Prospect, IL 2 pgs no date.

*BandMaster* 101, *Model MF*, Rubber Band Technology, 1 pg, Aug., 1988.

*BandMaster* 201, *Model B*, RubberBand Technology, 1 pg. Dec., 1988.

*BUNN–Strapping Efficiency For Every Strapping Application*, 6 pgs.

*BUNN Models* 1691, 1991, 2091, 2491, 3091 *Tying Machines* 3 pgs.

EAM Mosca Strapping System, EAM Industries, PA, 6 pgs. No Date.

*Tape It COM Taping Machines*, EAM Industries, 2 pgs. no date.

*Tach–It Twisters*, Clements Industries, NJ, 1 pg, 1986.

*Tach–It Twisters Model* 3558, Clements Industries, NJ 1 pg. 1986.

*Akebono OB*–300 Interpower Packaging, IL, 2 pgs. No date.

*Power* 260 *Automatic Strapping Machine*, Interpower, 2 pgs. 1991.

*Cellocoup*, The John Henry Co., Lansing MI, 4 pgs., 1992.

*Twine Tying Machines*, Saxmayer Corp, St. Louis, 7 pgs. No Date.

*Model 6 String Tyer* Saxmayer Corp. St. Louis MO, 2 pgs. No Date.

*Model EM RouteMaster* Saxmayer Corp, Blissfield, MI 2 pgs No Date.

*Pak–Tyer* 2000 Felins, Milwaukee, WI, 4 pgs. No date.

*Color Them Happy*, Highland Supply Corp, Highland IL 1 pg No Date.

*Super Seller*! Floratrop, Inc. Lake Worth, FL 1 pg No Date.

*Christmas Spirit* Costa Nursery Farms, Goulds, FL 1 pg No Date.

*Now More Than Ever* Bay City Flower Co, Half Mn Bay, GA 1 p No Dt.

*Highlander Speed Covers*®, Highland Supply Corp. IL 2 pg. Sep., 1992.

SpeedCover® The Original Pre–Formed Pot Cover, Highland Supply Corp., Highland IL 6 pgs, 1989.

SpeedSheets™ and Speed Rolls, Highland Supply Corp., Highland IL 1 pgs, 1990.

Olimex Bomen/Struiken BindMachine, Olimex, Olimex, Holland 6 pgs No Date.

MEANS FOR SECURING A DECORATIVE COVER ABOUT A FLOWER POT

IN RELATED REFERENCES

This application is a continuation of U.S. Ser. No. 08/124,843, filed Sep. 21, 1993, entitled "MEANS FOR SECURING A DECORATIVE COVER ABOUT A FLOWER POT", now U.S. Pat. No. 5,417,033, which is a continuation of U.S. Ser. No. 07/819,311 filed Jan. 9, 1992, entitled MEANS FOR SECURING A DECORATIVE COVER ABOUT A FLOWER POT, now abandoned; which is a continuation of U.S. Ser. No. 07/765,416, filed Sep. 26, 1991, entitled MEANS FOR SECURING A DECORATIVE COVER ABOUT A FLOWER POT, now U.S. Pat. No. 5,105,599, issued Apr. 21, 1992; which is a continuation of U.S. Ser. No. 07/530,491, filed May 29, 1990, entitled MEANS FOR SECURING A DECORATIVE COVER ABOUT A FLOWER POT, now abandoned; which is a continuation of U.S. Ser. No. 07/315,169, filed Feb. 24, 1989, entitled MEANS FOR SECURING A DECORATIVE COVER ABOUT A FLOWER POT, now abandoned.

FIELD OF THE INVENTION

The present invention relates generally to means for applying a sheet of material generally about the outer peripheral surface of a flower pot utilizing a band applicator.

BRIEF DESCRIPTION OF THE DRAWING

Figure 1:
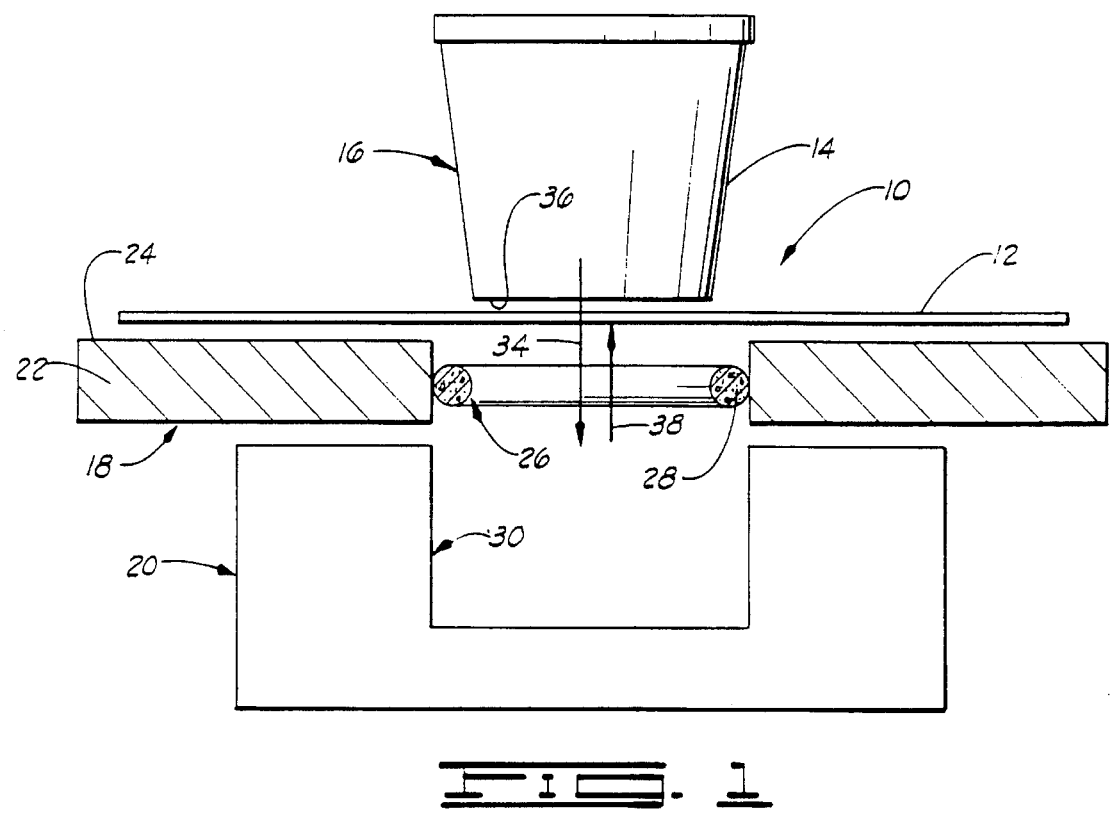
FIG. 1 is a sectional, diagrammatic view illustrating a flower pot generally positioned above a sheet of material and a band applicator in position for applying the sheet of material generally about the outer peripheral surface of the flower pot.
Figure 2:
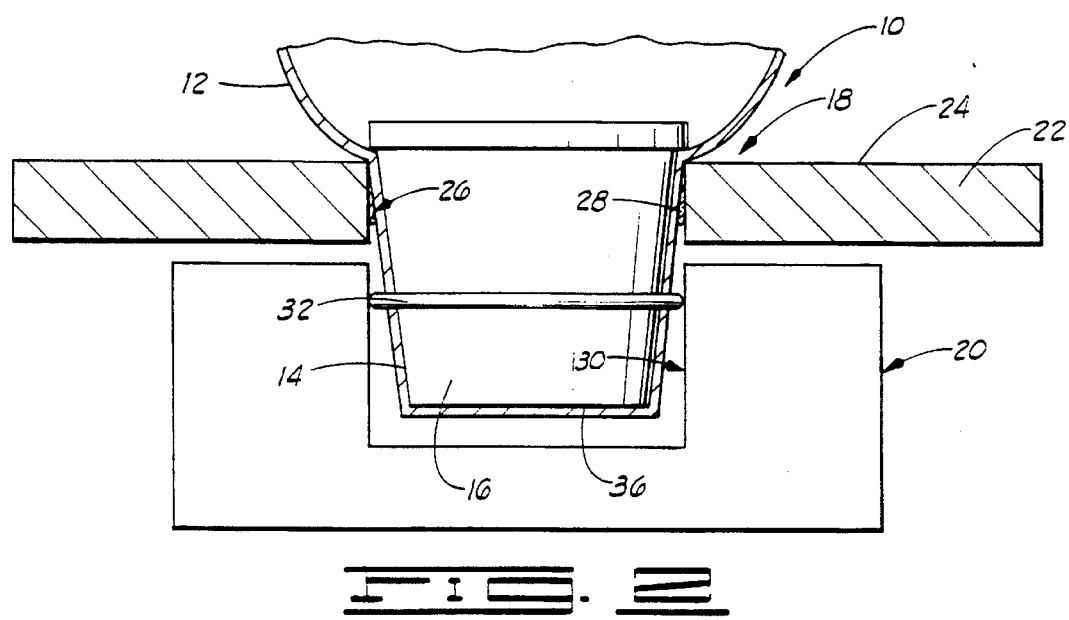
FIG. 2 is similar to FIG. 1 but showing the flower pot moved into the object opening of the band applicator with the sheet of material held in place about the outer peripheral surface of the flower pot by a band.

Shown in FIGS. 1 and 2 and designated therein by the general reference numeral 10 is a system for securing a sheet of material 12 generally about an outer peripheral surface 14 of a flower pot 16 generally for the purpose of providing a decorative cover for the flower pot 16. The system 10 includes a cover forming device 18 and a band applicator 20.

The cover forming device 18 comprises a platform 22 having an upper support surface 24 and a flower pot opening 26 which is formed therethrough and intersects the support surface 24. A generally circularly shaped applicator 28 is supported on the platform 22 and the applicator 28 preferably is constructed of a foam-like material adapted to engage the material and the flower pot without damaging the material or the flower pot. The opening through the applicator 28 forms the flower pot opening 26. A cover forming device which is constructed and operates like the covering forming device 18 is described in detail in U.S. Pat. No. 4,733,521 entitled COVER FORMING APPARATUS, incorporated specifically herein by reference.

The sheet of material 12 may be a shape sustaining material such as a foil for example or a non-shape sustaining cellophane or processed organic polymer film material such as a processed organic polymer film like a polypropylene film for example. The term "processed organic polymer film" as used herein means a man-made resin such as a polypropylene as opposed to naturally occurring resins such as cellophane. A processed organic polymer film is relatively strong and not subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desireable in many applications which is not the case with an untreated paper, for example, unless the paper is treated with a water resistant coating or impregnated with water a resistant material or laminated with such water resistant material. It also should be noted that some papers, such as long fiber papers, are substantially resistant to tearing (substantially non-tearable when used as a placed in accordance with the present invention). In addition, a relatively thin film of a substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible, can be made in a sheet-like format for forming into the package 10 of the present invention.

A decorative pattern, such as a solid color and/or an embossed pattern, and/or other decorative surface ornamentation may be applied to the inner surface and/or the outer surface of the container 14.

The flower pot cover 10 may be constructed of a single sheet of material or a plurality of sheets of material. When constructed of a plurality of sheets of material, each sheet of material has a thickness in a range of from less than about 1.0 mil to about 2.5 mils. However, the upper limit on the thickness of each sheet of material could be as high as 20.0 mils depending on the type of material selected. Further, the resulting flower pot cover has a thickness in a range of from less than about 1.0 mils to about 2.5 mils which could be as high as 20.0 mils depending upon the number of sheets of material utilized and the type of materials selected.

The band applicator 20 includes an object opening 30 which is sized to receive a portion of a flower pot. The band applicator 30 is constructed and adapted to substantially automatically apply a band about an object placed within the object opening 30. The term "band" as used herein means any material which may be secured about an object such as the flower pot 16 such as bands commonly referred to as elastic bands or rubber bands and also includes any other type of material such as string or metal or rubber or plastic which may be secured about an object such as the flower pot 16. Band applicators which are constructed to operate like the band applicator 20 described herein are commercially available such as the band applicator available from Rubber Band Technology Limited of Yaykima, Washington and referred to or identified by their mark "BandMaster". Thus, a detail description of the construction and operation of the band applicator is not deemed necessary herein.

In general, the sheet of material 12 is formed generally about the outer peripheral surface 14 of the flower pot 16 and the flower pot 16 with the sheet of material 12 formed generally about the outer peripheral surface 14 thereof is placed into the object opening 30 the band applicator 20.

After the flower pot 16 with the sheet of material 12 formed thereabout is placed into the object opening 30, the band applicator 20 is accuated to cause a band 32 to be applied about the material and generally about the outer peripheral surface 14 of the flower pot 16. The band 32 cooperates to secure the sheet of material 12 in position disposed generally about the outer peripheral surface 14 of the flower pot 16. After the band 32 has been applied to the outer peripheral surface 14 and about the sheet of material 12, the flower pot 16 with the sheet of material 12 secured thereto by the band 32 is removed from the object opening 30 and the band applicator 20.

The sheet of material 12 is held in place disposed generally about the outer peripheral surface 14 of the flower pot 16 while the flower pot 16 with the sheet of material 12 is disposed in the object opening and during the applying of the band 32 to the flower pot 16. In some applications, the sheet of material 12 may be held by hand formed generally about the outer peripheral surface 14 of the flower pot 16 while the flower pot 16 with the sheet of material held thereabout is disposed in the object opening 30 for applying band 32 thereto.

As shown in FIGS. 1 and 2 and in one preferred form, the cover forming device 18 is used to hold the sheet of material 12 in place generally about the outer peripheral surface 14 of the flower pot 16 during the applying of the band 32. The sheet of material 12 is placed on the upper surface 24 of the platform 22 and positioned so that the sheet of material 12 generally is centered over the flower pot opening 26. The flower pot 16 then is positioned generally above the flower pot opening 26 and above the sheet of material 12. The flower pot 16 then is moved in a downwardly direction 34 to a position wherein a lower end 36 of the flower pot 16 engages a central portion of the sheet of material 12. The flower pot 16 then further is moved in the downward direction 34 thereby pushing the flower pot 16 along with a portion of the sheet of material 12 generally in the downwardly direction 34 and through the: flower pot opening 26. The flower pot 16 with the sheet of material 12 formed thereabout further is moved in a downward direction 34 to position the lower end 36 portion of the flower pot 16 generally within the object opening and the band applicator 20. The sheet of material 12 is held position generally about the outer peripheral surface 14 of the flower pot 16 by the applicator 28. In this position, the band applicator 20 is actuated to apply the band 32 generally about the sheet of material and about the outer peripheral surface 14 of the flower pot 16. After the band 32 has been applied about the sheet of material 12 in the flower pot 16, the flower pot 16 then is moved in an upward direction 38 to remove the flower pot 16 from the object opening 30 and the flower pot opening 26. The sheet of material 12 is held in position extending about the flower pot 16 by the band 32.

Figure 3:
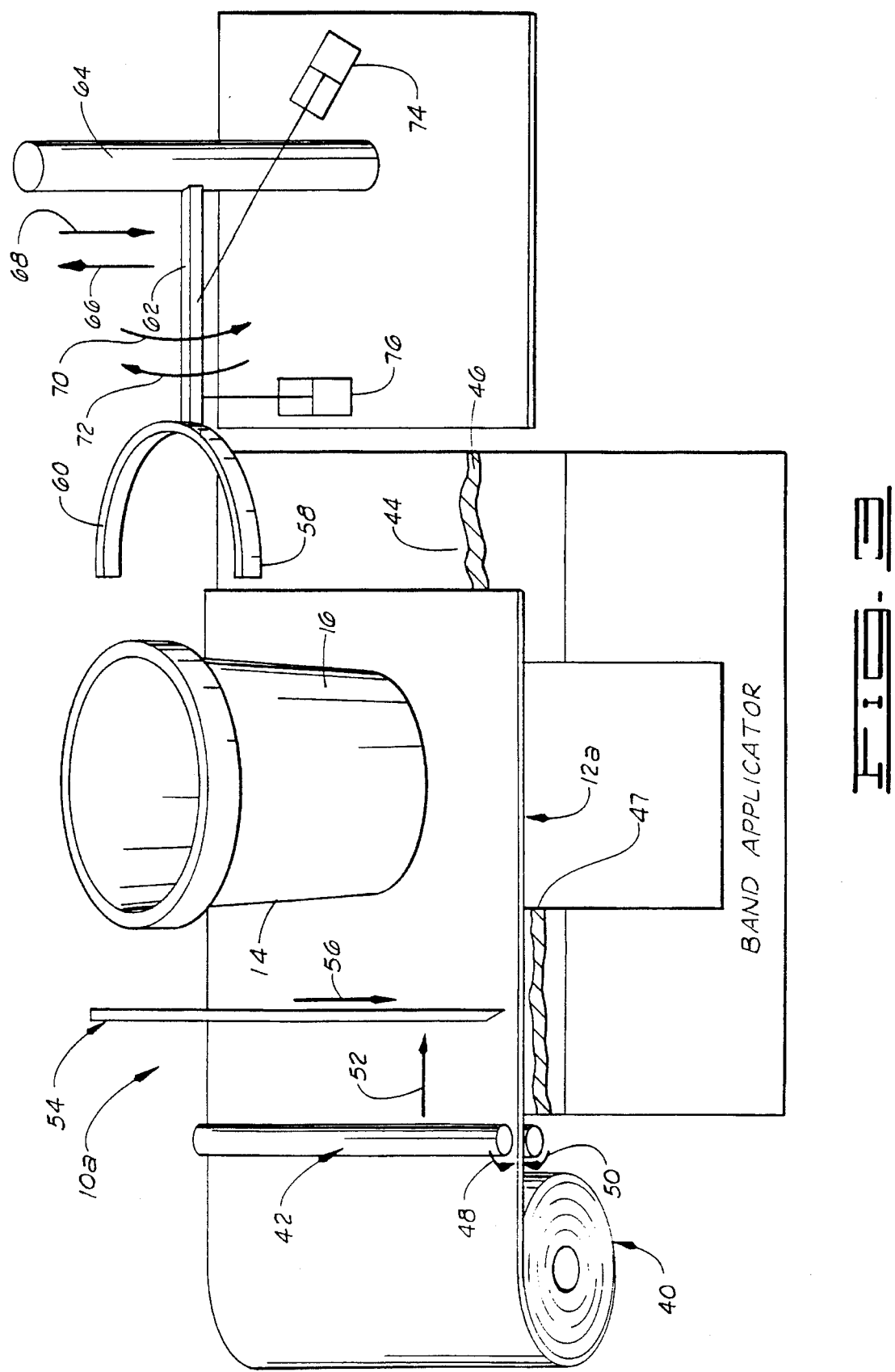
FIG. 3 is a sectional, diagrammatic view showing a system for automatically feeding the material to be applied about the flower pot to the band applicator.

Embodiment of FIG. 3

Shown in FIG. 3 is a modified system 10a for securing a sheet of material about the flower pot 16 in a manner like that described before with respect to FIGS. 1 and 2. The system 10a includes a roll of material 40 which is supported so that material may be unrolled from the roll of material 40. The material in the roll of material 40 extends from the roll of material 40 through a pair of rollers 42 and over a portion of an upper surface 44 of a platform 46. The platform 46 includes a flower pot opening 47.

At least one of the rollers 42 is powered so that by rollingly actuating the rollers 42, the rollers 42 are rotated in the respective directions 48 and 50 as indicated in FIG. 3 to move the material in a general direction 52 to a position to wherein a predetermined amount of the material has been disposed generally over the flower pot opening 47 in the platform 46. After a predetermined amount of the material has been unrolled from the roll of material 40 and positioned generally over the flower pot opening 47, a knife 54 is actuated and moved in a downward direction 56 to a position wherein the knife 54 cuttingly engages the material thereby severing a sheet of material 12a from the roll of material 40. The knife 54 is shown in FIG. 3 in the cutting position.

The system 10a also includes a generally U-shaped fork 58 forming an opening 60 which is connected to one end of a bar 62. The opposite end of the bar 62 is movably connected to a post 64 so that the bar 62 may be moved in an upward direction 66 or in a downward direction 68. The bar 62 also is pivotally connected to the post 64 so that the bar 62 may be rotated in a first direction 70 and in a second direction 72.

A first hydraulic cylinder 74 is connected to the bar 62 for moving the bar 62 in the upward or the downward direction 66 or 68. A second hydraulic cylinder 76 is connected to the bar 62 for moving the bar 62 in the direction 70 or 72.

In operation, the flower pot 16 is disposed in the opening 60 and the fork 68 and supported in the fork The bar 62 is moved by the hydraulic cylinder 74 and 76 to position the flower pot 16 generally over the flower pot opening 47 and over the object opening 30 in the band applicator 20. After the sheet of material 12a has been cut from the roll of material 40, the second hydraulic; cylinder 76 is actuated to move the bar 62 and the flower pot 16 connected thereto in the downward direction 68 thereby moving the flower pot 16 and the sheet of material 12a through the flower pot opening 47 into the object opening 30 and the band applicator 20. The band applicator 20 then is actuated to apply the band about the sheet of material 12a and generally about the outer peripheral surface 14 of the flower pot 16 thereby securing the sheet of material 12a to the outer peripheral surface 14 of the flower pot in the manner described.

After the band has been applied to the sheet of material 12a and the flower pot 16, the second hydraulic cylinder 76 is actuated to move the bar 62 and the flower pot 16 connected thereto in the upward direction 66 to a position to wherein the flower pot 16 is positioned generally above the flower pot opening 47 generally above the upper surface 44 of the platform 46. The first hydraulic cylinder 74 then is actuated to pivotally move the bar 62 and the flower pot connected thereto in the direction 72 so the flower pot 16 with the sheet of material 12a secured thereto by the band can be removed from the fork 58 and another flower pot can be disposed in the fork 58.

Changes may be made in the construction and operation of the various components and assemblies described herein, and changes may be made in the steps or the sequence of the steps described herein without departing from the spirit and the scope of the invention as defined in the following claims.

What is claimed is:

1. A method for securing a sheet of material generally about a flower pot to form a decorative cover for the flower pot and securing the decorative cover about the flower pot utilizing a band applicator having an object opening adapted to receive at least a portion of the flower pot having the decorative cover disposed thereabout and substantially automatically apply a band to secure the decorative cover about the flower pot when the flower pot having the decorative cover disposed thereabout is positioned in the object opening of the band applicator, the flower pot being characterized as having a bottom, an upwardly extending outer peripheral surface and an open upper end, the method comprising:

forming a sheet of material generally about the bottom and upwardly extending outer peripheral surface of the flower pot to provide a decorative cover which extends about the bottom and upwardly extending outer peripheral surface of the flower pot and extends upwardly from the open upper end of the flower pot such that the open upper end of the flower pot remains substantially uncovered by the decorative cover;

moving the flower pot with the decorative cover formed generally about the bottom and upwardly extending outer peripheral surface thereof into the object opening in the band applicator and utilizing the band applicator to automatically apply the band about the decorative cover disposed generally about the bottom and the upwardly extending outer peripheral surface of the flower pot, the band cooperating to secure the decorative cover in position disposed generally about the bottom and upwardly extending outer peripheral surface of the flower pot such that the open upper end of the flower pot remains substantially uncovered by the portion of the decorative cover extending upwardly from the open upper end of the flower pot; and removing the flower pot with the decorative cover secured thereto by the band from the object opening in the band applicator.

2. The method of claim 1 wherein the step of forming the sheet of material about the bottom and upwardly extending outer peripheral surface of the flower pot further comprises: holding the decorative cover in place disposed generally about the bottom and the upwardly extending outer peripheral surface of the flower pot while the flower pot with the decorative cover disposed thereabout is disposed in the object opening in the band applicator and during the applying of the band by the band applicator.

3. The method of claim 1 wherein the material is a non-shape sustaining material.

4. The method of claim 1 wherein the step of forming the sheet of material about the bottom and upwardly extending outer peripheral portion of the flower pot further comprises:

providing a cover forming device having a flower pot opening adapted to receive at least a portion of the sheet of material and at least the bottom and a portion of the upwardly extending outer peripheral surface of the flower pot;

placing the sheet of material over the flower pot opening in the cover forming device; and moving the bottom of the flower pot into engagement with the sheet of material and moving the flower pot and the sheet of material through the flower pot opening so that the sheet of material is formed about the bottom and the upwardly extending outer periphery of the flower pot while the open upper end of the flower pot remains substantially uncovered by the portion of the sheet of material extending upwardly from the open upper end of the flower pot as the flower pot and the sheet of material are moved through the flower pot opening of the cover forming device.

5. The method of claim 4 further comprising:

holding, via the cover forming device, the decorative cover in place disposed generally about the bottom and the upwardly extending outer peripheral surface of the flower pot while at least a portion of the flower pot with the decorative cover disposed thereabout is disposed in the object opening in the band applicator and while the band is being placed about the flower pot and the decorative cover.

6. The method of claim 4 wherein the step of placing the sheet of material over the flower pot opening further comprises:

unrolling material from a roll of material and moving a portion of the material over the flower pot opening in the cover forming device; and cutting the material from the roll of material to form a sheet of material sized to form the decorative cover about the bottom and upwardly extending outer peripheral surface of the flower pot while permitting a portion of the decorative cover to extend upwardly from the open upper end of the flower pot.

7. An apparatus for securing a sheet of material generally about the bottom and upwardly extending outer peripheral surface of a flower pot to form a decorative cover for the flower pot wherein an open upper end of the flower pot remains substantially uncovered by the decorative cover, comprising: a cover forming device having a flower pot opening shaped and sized to receive a flower pot, the sheet of material being placeable generally over the flower pot opening in the cover forming device, the bottom of the flower pot engaging the sheet of material placed over the flower pot opening and the flower pot and sheet of material being movable through the flower pot opening of the cover forming device whereby the sheet of material is formed into a decorative cover which extends generally about the bottom and the upwardly extending outer peripheral surface of the flower pot, while maintaining the open upper end of the flower pot substantially uncovered by the decorative cover as the flower pot is moved through the flower pot opening of the cover forming device; and a band applicator having an object opening positioned near the cover forming device with the object opening being generally positioned with respect to the flower pot opening whereby the flower pot with the decorative cover disposed thereabout is movable via the bottom of the flower pot through the flower pot opening of the cover forming device and into the object opening of the band applicator, the band applicator being adapted to apply a band about the portion of the decorative cover disposed generally about the upwardly extending outer peripheral surface of the flower pot whereby the band cooperates to secure the decorative cover in position disposed generally about the bottom and the upwardly extending outer peripheral surface of the flower pot such that the open upper end of the flower pot remains substantially uncovered by the portion of the decorative cover extending upwardly from the open upper end of tile flower pot.

8. The apparatus of claim 7 wherein the cover forming device is adapted to hold the decorative cover generally about the bottom and the upwardly extending outer peripheral surface of the flower pot while the flower pot with the decorative cover disposed thereabout is disposed generally within the flower pot opening of the cover forming device.

9. A method for forming a decorative cover about a flower pot utilizing a cover forming device comprising a platform having an upper support surface and a flower pot opening which is formed therethrough and which intersects the upper support surface comprising the steps of:

providing a flower pot having a bottom, an upwardly extending outer peripherally surface and an open upper end;

providing a sheet of material;

disposing the sheet of material upon the upper support surface of the platform of the cover forming device and over the flower pot opening therein;

placing the flower pot over the flower pot opening in the cover forming device;

moving the flower pot in a downwardly direction and into engagement with the sheet of material and moving simultaneously the flower pot and the sheet of material in a downwardly direction through the flower pot opening in the cover forming device and forming a decorative cover for the flower pot from the sheet of material which is disposed about the bottom and upwardly extending outer peripheral surface of the flower pot while permitting the open upper end of the flower pot to remain substantially open and uncovered by the decorative cover, the cover forming device maintaining the decorative cover in place about the bottom and upwardly extending outer peripheral surface of the flower pot;

applying a band about the decorative cover and the flower pot while the decorative cover is held in place about the flower pot via the cover forming device to secure the decorative cover about the bottom and the upwardly extending outer peripheral surface of the flower pot while maintaining the upper open end of the flower pot substantially uncovered by the decorative cover; and removing the flower pot having the decorative cover secured about the bottom and upwardly extending outer peripheral surface thereof by the band from the flower pot opening in the cover forming device.

10. The method of claim 9 wherein the step of disposing the sheet of material over the flower pot opening in the cover forming device further comprises:

unrolling material from a roll of material;

moving a portion of the unrolled material upon the upper support surface of the platform of the cover forming device so that the portion of the unrolled material is positioned over the flower pot opening of the cover forming device; and cutting the unrolled material to provide the sheet of material placed over the flower pot opening of the cover forming device, the sheet of material being sized to form the decorative cover about the bottom and upwardly extending outer peripheral surface of the flower pot.

11. A method for securing a decorative cover about a bottom and an upward extending outer peripheral surface of a flower pot utilizing a band applicator so that an open upper end of the flower pot remains substantially uncovered by the decorative cover wherein the band applicator is provided with an object opening adapted to receive at least a bottom portion of the flower pot having the decorative cover formed thereabout and to substantially automatically apply a band about the decorative cover and the flower pot, the method comprising the steps of:

providing a flower pot having a bottom, an outer peripheral surface and an open upper end;

forming a sheet of material substantially about the bottom and outer peripheral surface of the flower pot to provide a decorative cover for the flower pot wherein the open upper end of the flower pot remains substantially uncovered by the decorative cover;

moving the flower pot having the decorative cover formed thereabout into the object opening of the band applicator via the bottom of the flower pot and automatically placing the band about the decorative cover and the flower pot for securing the decorative cover about the bottom and outer peripheral surface of the flower pot while leaving the open upper end of the flower pot substantially uncovered.

12. The method of claim 11 wherein the step of providing the sheet of material further comprises:

unrolling material from a roll of material; and cutting the material from the roll of material to form the sheet of material.

13. A method for forming and banding a decorative cover about a flower pot utilizing a cover forming device having a flower pot opening wherein the flower pot is characterized as having a bottom, an upward extending outer peripheral surface and an open upper end, the method comprising the steps of:

moving the flower pot having a sheet of material positioned adjacent the bottom of the flower pot in a downwardly direction through the flower pot opening in the cover forming device for forming a decorative cover from the sheet of material which extends about the bottom and upward extending outer peripheral surface of the flower pot while leaving the open upper end of the flower pot substantially uncovered and simultaneously holding the decorative cover in place substantially about the bottom and upward extending outer peripheral surface of the flower pot;

moving the bottom of the flower pot having the decorative cover formed about the bottom and upward extending outer peripheral surface of the flower pot by the cover forming device into an object opening of a band applicator device;

placing a band about the decorative cover and the flower pot for securing the decorative cover in position substantially about the bottom and upward extending peripheral surface of the flower pot while the cover forming device holds the decorative cover in place about the flower pot and while leaving the open upper end in the flower pot substantially uncovered by the decorative cover; and removing the flower pot having the decorative cover secured thereto by the band from the object opening of the band applicator.

14. The method of claim 13 wherein the step of providing the sheet of material further comprises:

unrolling material from a roll of material; and cutting the material from the roll of material to form the sheet of material.

15. The method of claim 14 wherein the band is automatically placed about the decorative cover and the upward extending outer peripheral surface of the flower pot.

16. The method of claim 9 wherein the band is automatically placed about the decorative cover and the flower pot while the decorative cover is held in place about the flower pot via the cover forming device.

17. The method of claim 13 wherein the band is automatically placed about the decorative cover and the flower pot while the decorative cover is held in place about the flower pot via the cover forming device.

* * * * *